United States Patent [19]
Dosani et al.

[11] Patent Number: 6,024,290
[45] Date of Patent: Feb. 15, 2000

[54] FLUID TEMPERING SYSTEM

[76] Inventors: Nazir Dosani, 8 Harris Way, Thornhill, Ontario, Canada, L3T-5A7; Nizar Ladha, 192 Harrision Drive, Newmarket, Ontario, Canada, L3Y-4B6

[21] Appl. No.: 09/047,367

[22] Filed: Mar. 25, 1998

[51] Int. Cl.[7] .................................................. G05D 23/13
[52] U.S. Cl. ..................... 236/12.12; 236/21 B; 236/24; 165/132
[58] Field of Search ............... 236/12.12, 21 B, 236/23, 24, 25 R, 25 A; 165/132; 126/374

[56] References Cited

U.S. PATENT DOCUMENTS

| | | | |
|---|---|---|---|
| 3,232,336 | 2/1966 | Leslie et al. ............................. | 165/38 |
| 3,670,807 | 6/1972 | Muller ....................................... | 165/39 |
| 5,050,062 | 9/1991 | Hass ......................................... | 364/152 |
| 5,115,491 | 5/1992 | Perlman et al. ......................... | 392/454 |
| 5,459,890 | 10/1995 | Jarocki ..................................... | 4/668 |

*Primary Examiner*—Henry Bennett
*Assistant Examiner*—Marc Norman

[57] ABSTRACT

A fluid tempering system for supplying tempered fluid to hot fluid distribution system, for example water at a constant temperature by controlling the amount of cold water from the cold water supply mixing with hot water from the water heater, to control the temperature of water in the hot water distribution system. The higher temperature water mixed with cold water reduces scalding hazard and also increases the volume of hot water, at a tampered temperature, within the hot water distribution system. The system also eliminates the slug in the tempering system.

19 Claims, 5 Drawing Sheets

FLUID TEMPERING SYSTEM

FIELD OF INVENTION

The present invention is directed to a fluid tempering system including a heated storage tank to deliver tempered water or other fluid to the user/consumer.

BACKGROUND OF THE INVENTION

The present invention relates to fluid temperature control apparatus. In particular it is concerned with apparatus for providing fluid, for example water, to a user at a required temperature where this is achieved by mixing in varying proportions two supplies of liquid at different temperature, designated "cold" and "hot".

The apparatus is of general application but is best explained in relation to control of a standard North American domestic hot water tank.

In a conventional water heating systems, cold water, delivered to a combined water heater/storage tank, is heated to a desired temperature in readiness for demand draw by the user.

In a direct demand system, which is commonly used for domestic hot water supply, the apprehension of scalding the user, generally results in fixing the maximum temperature to which water may be heated in the water heater tank, to a relatively low setting such as 60 degree C. (140 degree F.) or below.

However, such a tepid water temperature can encourage bacterial growth in the water within the storage tank. It is therefore preferred, for sanitary purposes, that the water in the tank be heated to a sanitizing temperature to destroy bacteria or other potential growth organisms.

Trihey, John M. of Australia, (PCT patent number PCT/AU90/00159) teaches a method of tempering hot water by creating a flow path between a cold water inlet and a hot water outlet. The flow path is created using a tube of relatively narrow bore. A manual valve is disposed within the tube and can be set to control the temperature of the water in the distribution system. The ratio of cold water and hot water mix is determined by the size of the tube and the setting of the manual valve. Unfortunately, this predetermined ratio does not take into account the varying temperature of the cold water supply, the changes in pressure within the hot water tank as the temperature of the water therein increases or decreases, and decreases in the water temperature as water is drawn from the hot water tank. As a result, since the ratio is predetermined, the user does not get the benefit of the tepid water left in the tank, since the tepid water will be further cooled by mixing it with water from the cold water inlet.

Perlman et al. of Canada (U.S. Pat. No. 5,115,491) teaches a tempering system using a heat exchanger and a valve. To get maximum benefit from the system the water within the storage tank is heated to scalding temparature. However, the heat exchanger makes the system too expensive. Furthermore, the use of a heat exchanger makes the system prone to scaling problems.

The present invention overcomes these disadvantages by monitoring the temperature of water in the hot water distribution system and adjusting, in real time, the ratio of cold water mixing with hot water from the tank.

In a preferred embodiment of the invention the ratio of the cold water and hot water mixing is further adjusted by the temperature of water at the hot water outlet and also by the temperature of the cold water supply. As will be appreciated, the present system takes seasonal changes in the temperature of cold water supply as well as changes in temperature of hot water in the tank due to heating elements turning on or due to water being drawn from the hot water tank by the user, into account.

In a preferred embodiment of the present invention, a stepper motor valve which controls the ratio of the cold water mixing with hot water is installed near the cold water inlet. This position has a number of advantages as discussed below:

1. The cold water supply reduces the temperature around the valve, which can damage the electronic components.
2. The scaling problem within the valve is mitigated as scaling typically occurs on the hot water outlet side.
3. The the pressure within the tank is stabilized and so hot water, from the hot water outlet does not reach the valve thereby to inhibit the hot water slug.

The present invention further provides a means of preventing a slug within the fluid tempering system. Slug is the hot fluid left in the tempering system after the consumer has turned off the flow of fluid or the tempering system is not used for a period of time. The slug is created by hot fluid in the tank being at a higher temperature and therefore at a higher pressure. The slug pushes itself into the hot fluid distribution system. The temperature of the slug can be at a high enough temperature to cause scalding problems.

SUMMARY OF THE INVENTION

According to the invention, there is provided a system for distributing tempered fluid to a user. The system consists of a storage tank having heating means, outlet means for conveying heated fluid from the storage tank to a mixing valve for distribution system on demand, cold fluid inlet means for replenishing the storage tank on demand, and a flow path between the cold fluid inlet and the mixing valve. The ratio of cold fluid mixed with hot fluid is controlled by a stepper motor, which is adjusted by the temperature setting of the distribution system by the consumer.

Preferably, a temperature sensor in the hot fluid distribution system provides output to the mixing valve causing it to close cold fluid flow therein when hot fluid exiting tank and entering the mixing valve for distribution is below the temperature set by the consumer.

Preferably, the temperature sensor also provides output to the mixing valve causing it to allow for maximum flow of cold fluid therein when hot fluid exiting the tank and entering the mixing valve for distribution is above a scalding temperature as set by the consumer.

Preferably, a temperature sensor is located in the hot fluid distribution system to actuate a safety valve to avoid the fluid from entering the distribution system that is above a desired maximum temperature.

The present invention further provides means to reduce the slug in the fluid tempering system.

BRIEF DESCRIPTION OF THE DRAWINGS

In drawings, which illustrate by way of example only, a preferred embodiment of the present invention is shown wherein.

DETAILED DESCRIPTION OF THE INVENTION

Figure 1:
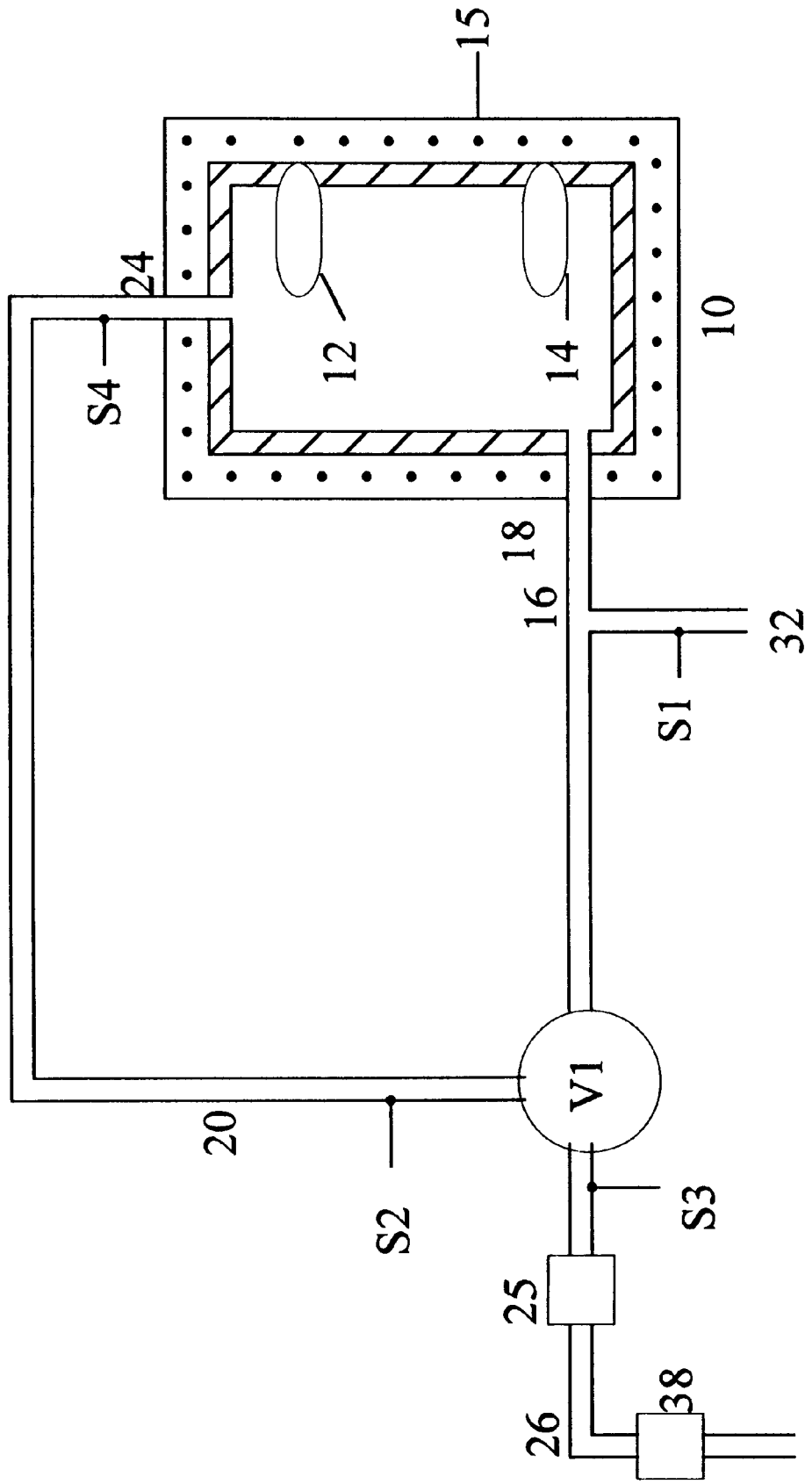
FIG. 1 is a block diagram of one embodiment of a fluid tempering system in accordance with the present invention.

For illustration purposes, specific embodiments of the present invention will be described in association with a standard electrically heated domestic hot water delivery tank having two immersed heating elements. A single 3-way mixing valve is placed near the cold water inlet to the tank as shown in FIG. 1. Other modification of the invention for use with other types of hot fluid delivery systems, use of different types of valves and the location of the valves will be obvious to one skilled in the art.

Figure 3:
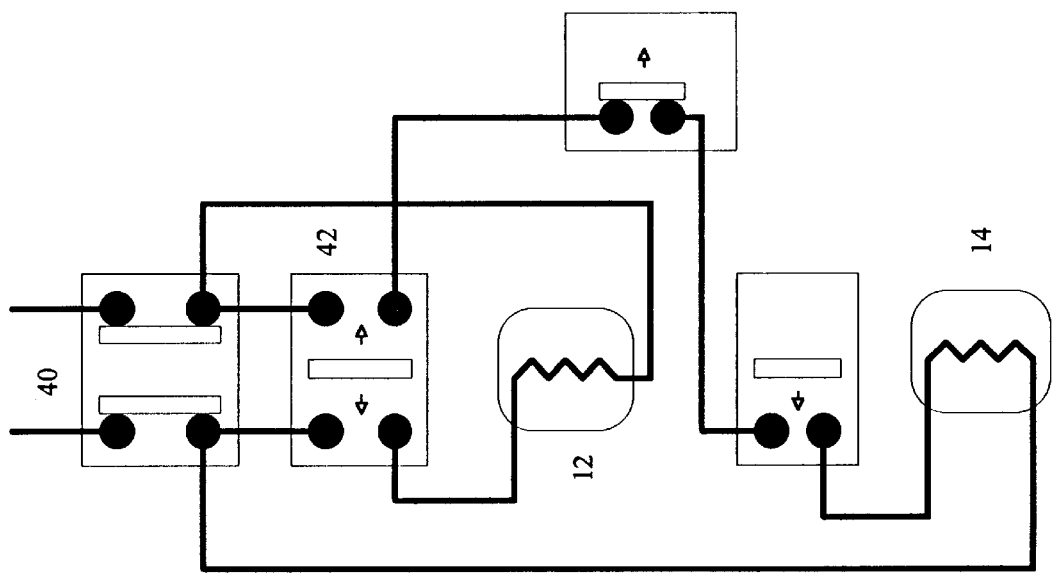
FIG. 3 is schematic diagram illustrating the circuitry used in standard North American hot water tanks.

As shown in FIG. 1, a water storage tank 10 is provided with heating elements 12 and 14 located adjacent the top and bottom of the tank, respectively. The elements 12 and 14 are electrically operated in order to heat a body of water within tank 10. In standard North American water heaters, the heating elements are operated in the alternative only, that is when one element is on, the other is off. As illustrated in FIG. 3, this done by connecting the elements 12 and 14 to a common power source 40 via a double-throw or flip-flop relay 42.

In conventional constructions for domestic use, the tank 10 is encased in an insulating material 15, such as glass fiber, in order to reduce heat dissipation of the heated water within tank 10. For the purpose of the present invention, a circuit interrupter, as illustrated in Applicants' PCT patent application No. PCT/CA93/00288, is connected to tank 10 to provide power demand control options. A higher level of thermal insulation may be considered to reduce heat loss during peak energy demand periods.

As illustrated in FIG. 1, the cold water supply 32 is connected to a flow path 16, extending between the cold water inlet 18 of tank 10 and an inlet port to a mixing valve V1. Mixing valve V1, is controlled by a stepper motor(not shown), sets the mixing ratio of hot water and cold water before the water is delivered to distribution system 26.

Mixing valve V1 also has an inlet port in full communication with flow path 20, that is coupled to the hot water outlet 24 of tank 10. The outlet port of mixing valve V1 delivers hot water to the distribution system 26. As water is drawn from the hot water distribution system 26, hot water is drawn from hot water outlet 24 and cold water is drawn from the flow path 16. Thus, the flow of cold water from the flow path 16 and hot water from flow path 20 into the mixing valve V1 forces the hot water and cold water to mix within the mixing valve V1 resulting in water at a lower temperature for distribution to the hot water distribution system 26.

The temperature of hot water required in the hot water distribution system 26 determines the amount of cold water flowing into mixing valve V1. As the temperature of hot water at outlet 24 drops, the amount of cold water flowing into the mixing valve V1 is reduced to compensate for the drop in temperature at the hot water outlet. Thus, the temperature of water in the hot water distribution system 26 is maintained generally at a constant temperature.

To maintain a generally constant temperature in the hot water distribution system, the amount of cold water flowing into the mixing valve V1 is further adjusted by the temperature of cold water supply as sensed by sensor S1. This adjustment compensates for seasonal variations in the temparature of the cold water supply and also for different geographical locations.

Furthermore if the temperature of hot water at outlet 24 drops below the preset temperature of the hot water distribution system, valve V1 stops the flow of cold water into the valve and directs the cold water into the tank 10 via cold water inlet 18. This gives the consumer extra hot water although at a lower temperature.

An exterior signal, such as a light (not shown), can also be associated with temperature sensor S2 to indicate, by visual inspection, when the water in the storage tank or system is below scalding temperature.

As an additional safety feature to prevent scalding water from flowing into the hot water distribution system, an independent safety shut-off valve 25 is located in the hot water distribution system 26 adjacent the outlet of the mixing valve V1.

The shut-off valve 25 can be a commercially sold valve from Memory Plumbing Products in Connecticut, U.S.A. sold under the trademark Shower Guard or a thermostat combined with a solenoid in a known manner for a safety shut-off valve.

As illustrated in FIG. 1, the position of mixing valve V1 is important. Pressure within tank 10 increases with an increase in water temperature. This increase in pressure within tank 10 pushes hot water out of the tank 10 via hot water outlet 24 and into flow path 20. With tap 38 closed, the hot water system becomes a closed system allowing the pressure between the outlet 24 and inlet 18 to equalize. To inhibit a slug from entering the distribution system, the mixing valve V1 is placed near inlet 18 to take advantage of this pressure equalization.

When utilizing a high temperature water storage system with a properly insulated storage tank, according to the invention, the energy required for re-heating the water in the storage tank can be greatly reduced. According to a further aspect of the present invention, the power supply demand for the heating means of the storage tank can be reduced significantly during lengthy periods of time, such as daily peak energy consumption periods.

Figure 4:
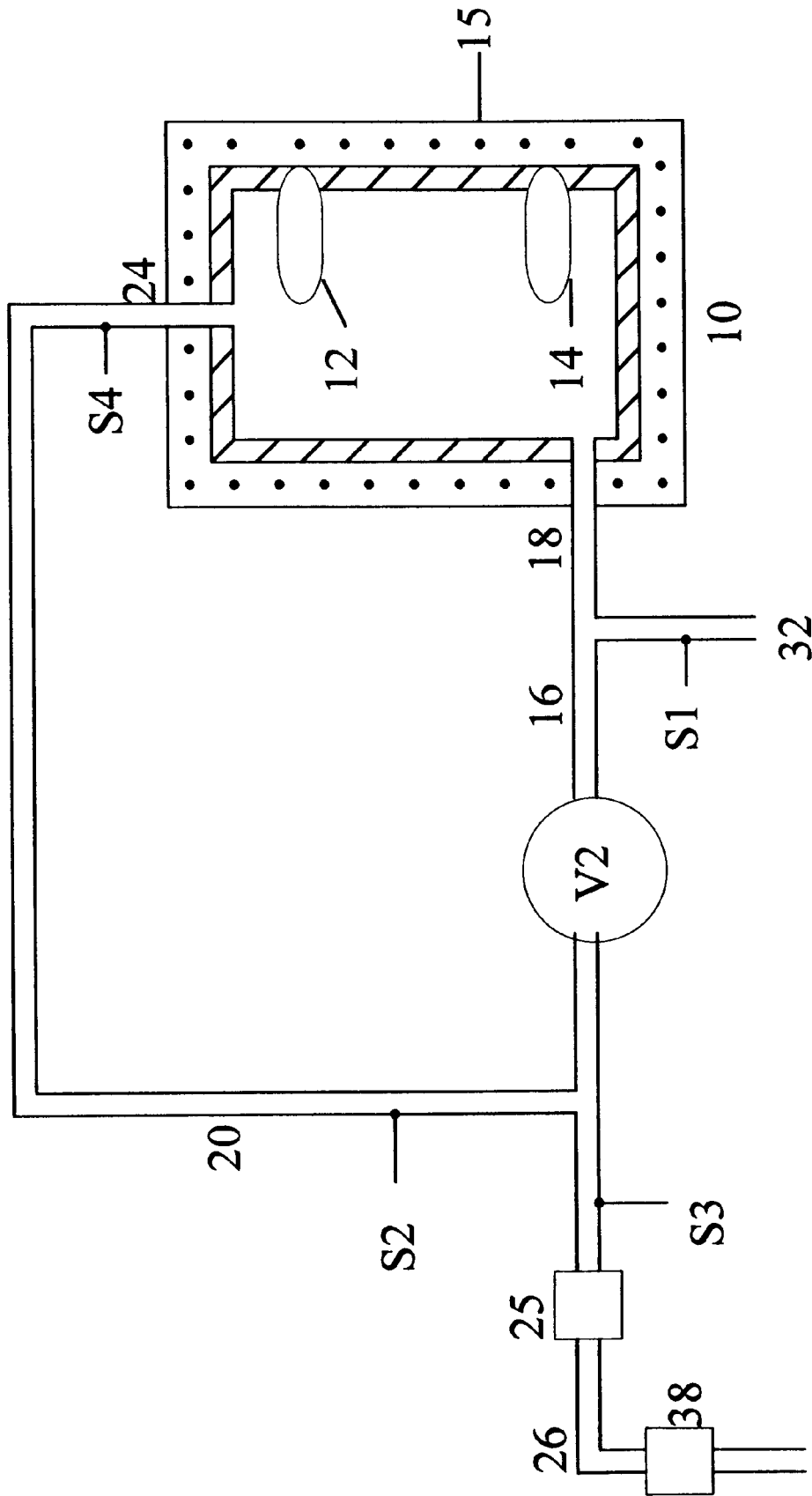
FIG. 4 is a block diagram of an alternate embodiment of a fluid tempering system in accordance with the present invention.

FIG. 4 illustrates an alternate embodiment wherein the stepper motor V2 is set within the flow path 16. In this position the stepper motor V2 controls the ratio of cold water 32 entering the cold water inlet 18 and the mixing chamber formed by hot water flow path 20 and cold water flow path 16.

Figure 5:
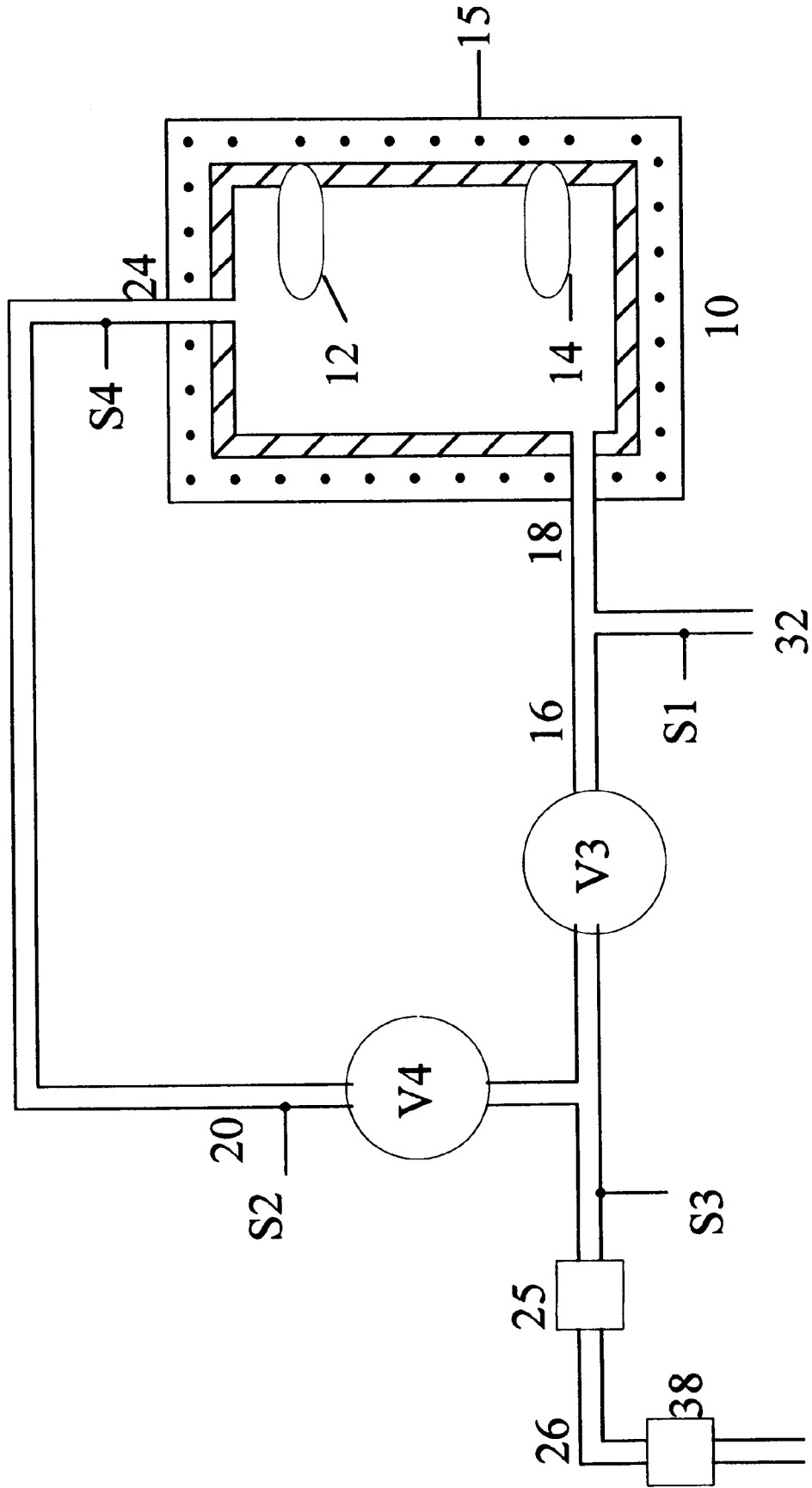
FIG. 5 is a block diagram of another alternate embodiment of a fluid tempering system in accordance with the present invention.

FIG. 5 illustrates an alternate embodiment wherein the stepper motor V1 is split into 2 separate valves V3 and V4. Valves V3 and V4 are 2-way valves, which either let the water flow through at a given ratio or stop the flow completely. The 2 separate valves give the system better control over varying pressures in the cold water supply 32 as cold water appliances, such as garden hose and the like are used and also the varying pressure within tank 10 as the temperature of water changes over time. Pressure within tank 10 increases with increase in water temperature and decreases as the water temperature drops.

Figure 2A:
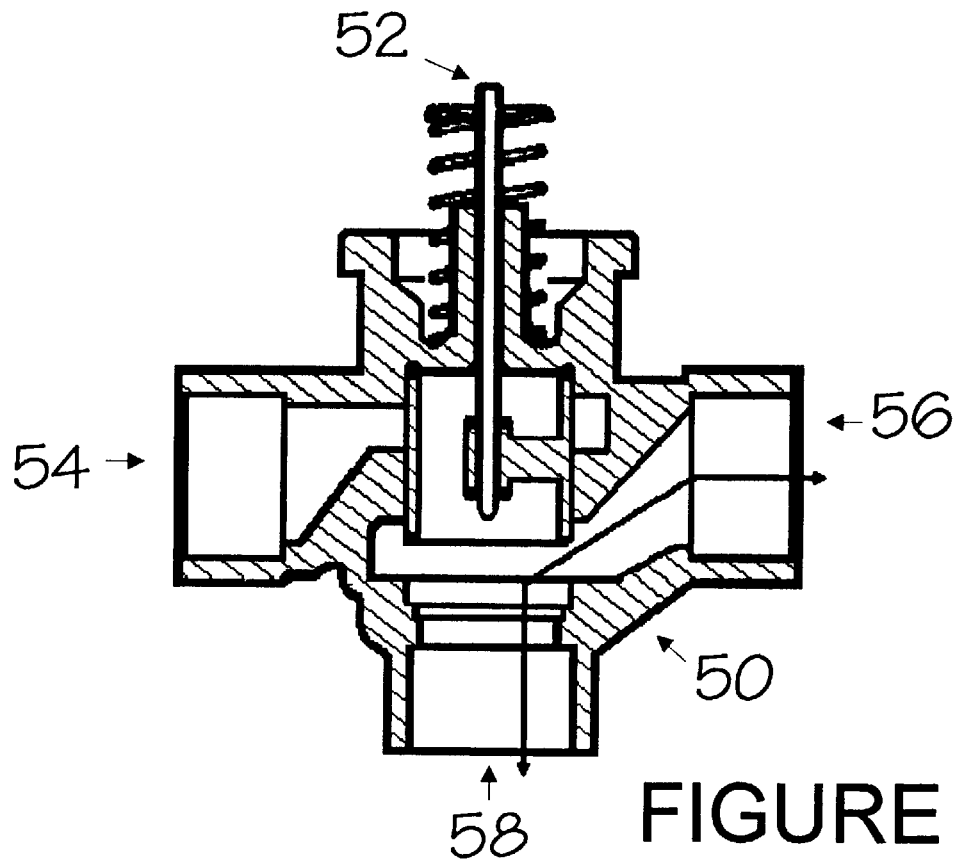
FIGS. 2A and FIG. 2B are cross-sectional views of a 3-way valve forming part of the fluid tempering system of FIG. 1.
Figure 2B:
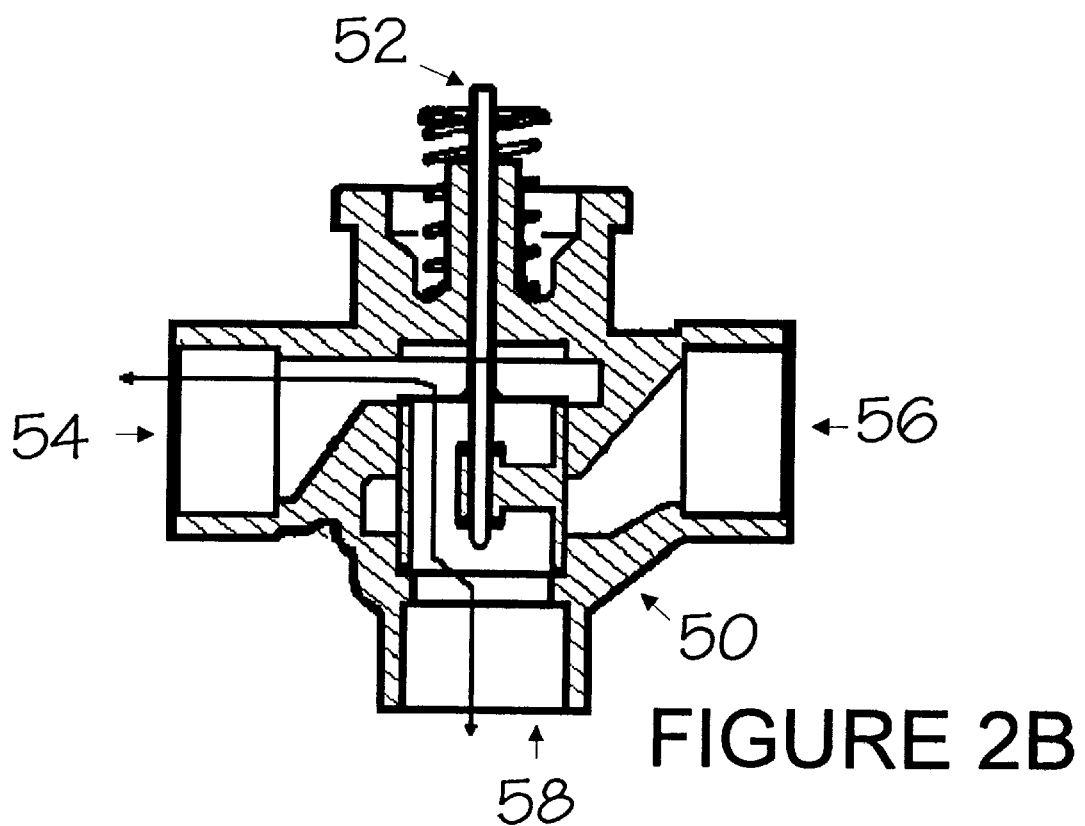

The mixing valve, as illustrated in FIGS. 2A and 2B, is explained in relation to FIG. 1. Port 56 is connected to flow path 16, which is in full communication with cold water supply 32. Port 54 is in full communication with hot water flow path 20 and port 58 is in full communication with hot water distribution system 26. Piston 52 is adjustable to let the cold water flow from port 56 and/or hot water from port 54 to port 58. Thus, the ratio of cold water from the cold water supply 32 is adjustable to mix with hot water from flow path 20 before entering hot water distribution system 26.

Cold water supply 32 flowing from port 56 and into port 58 will reduce the temperature of hot water distribution 26 while hot water flowing into port 54 will increase the temperature of hot water distribution system 26. Thus, the position of piston 52, which is controlled by the stepper motor, sets the temperature of water in the hot water distribution system 26.

The temperature of hot water distribution system 26 and other parameters such as maximum temperature of cold water supply 32, the maximum temperature of water within tank 10 and the like can be programmed into the system either remotely or by a keypad (not shown), either by the user or the electrical utility company.

It will be understood that, although various features of the invention have been described with respect to one or another of the embodiments of the invention, the features and embodiments of the invention may be combined or used in conjunction with other features and embodiments of the inventions as described and illustrated herein. Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

What is claimed is:

1. A fluid tempering system comprising:
    a storage tank adapted to hold fluid, said storage tank having a cold fluid inlet, a hot fluid outlet and at least one heating element therein to heat fluid held in said storage tank;
    a cold fluid path receiving cold fluid from a source and delivering cold fluid to said storage tank via said cold fluid inlet;
    a temperature sensor monitoring the temperature of cold fluid delivered to said storage tank;
    a mixing zone having a first inlet coupled to said hot fluid outlet via a hot fluid path and a second inlet coupled to said cold fluid path, said mixing zone mixing hot fluid received from said hot fluid path with cold fluid received from said cold fluid path to cool said hot fluid prior to delivery to a distribution system; and
    a valve responsive to said temperature sensor and controlling the amount of cold fluid delivered to said mixing zone so that the temperature of hot fluid delivered to said distribution system remains generally constant irrespective of fluctuations in the temperature of said cold fluid.

2. A fluid tempering system as defined in claim 1 further including a second temperature sensor monitoring the temperature of hot fluid delivered to said hot fluid path, said valve also being responsive to said second temperature sensor and adjusting the amount of cold fluid delivered to said mixing zone to maintain the temperature of hot fluid delivered to said distribution system at said generally constant temperature irrespective of fluctuations in temperature of hot fluid in said storage tank.

3. A fluid tempering system as defined in claim 2 wherein said valve inhibits delivery of cold fluid to said mixing zone in response to said second temperature sensor when the temperature of hot fluid delivered to said hot fluid path is below a pre-set temperature.

4. A fluid tempering system as defined in claim 3 further including a shut-off valve interposed between said mixing zone and said distribution system and a third temperature sensor monitoring the temperature of fluid delivered to said distribution system, said shut-off valve being responsive to said third temperature sensor and inhibiting fluid flow to said distribution system when the temperature of fluid delivered by said mixing zone is above a predetermined scalding water temperature.

5. A fluid tempering system as defined in claim 1 wherein said valve is a mixing valve including said first and second inlets and defining said mixing zone, said mixing valve having an outlet port coupled to said distribution system.

6. A fluid tempering system as defined in claim 5 further including a second temperature sensor monitoring the temperature of hot fluid delivered to said hot fluid path, said mixing valve also being responsive to said second temperature sensor and adjusting the amount of cold fluid delivered to said mixing zone to maintain the temperature of hot fluid delivered to said distribution system at said generally constant temperature irrespective of fluctuations in temperature of hot fluid in said storage tank.

7. A fluid tempering system as defined in claim 6 wherein said mixing valve inhibits delivery of cold fluid to said mixing zone in response to said second temperature sensor when the temperature of hot fluid delivered to said hot fluid path is below a pre-set temperature.

8. A fluid tempering system as defined in claim 7 further including a shut-off valve interposed between said mixing valve and said distribution system and a third temperature sensor monitoring the temperature of fluid delivered to said distribution system, said shut-off valve being responsive to said third temperature sensor and inhibiting fluid flow to said distribution system when the temperature of fluid delivered by said mixing valve is above a predetermined scalding water temperature.

9. A fluid tempering system as defined in claim 1 wherein said mixing zone is constituted by a T-junction including said first inlet receiving hot fluid from said hot fluid path and said second inlet receiving cold fluid from said valve.

10. A fluid tempering system as defined in claim 9 further including a second valve interposed between said first inlet and said hot fluid path and a second temperature sensor monitoring the temperature of hot fluid delivered to said hot fluid path, said second valve being responsive to said second temperature sensor and adjusting the amount of hot fluid delivered to said T-junction.

11. A fluid tempering system comprising:
    a storage tank adapted to hold fluid, said storage tank having a cold fluid inlet, a hot fluid outlet and at least one heating element therein to heat fluid held in said storage tank;
    a cold fluid path receiving cold fluid from a source and delivering cold fluid to said storage tank via said cold fluid inlet;
    a mixing zone having a first inlet coupled to said hot fluid outlet via a hot fluid path and a second inlet coupled to said cold fluid path, said mixing zone mixing hot fluid received from said hot fluid path with cold fluid received from said cold fluid path to cool said hot fluid prior to delivery to a distribution system; and
    a valve controlling the amount of cold fluid delivered to said mixing zone so that the temperature of hot fluid delivered to said distribution system remains generally constant, said valve being positioned adjacent said cold fluid inlet.

12. A fluid tempering system as defined in claim 11 further including at least one temperature sensor to monitor the temperature of fluid delivered to said mixing zone, said valve controlling the amount of cold fluid delivered to said mixing zone in response to said at least one temperature sensor.

13. A fluid tempering system as defined in claim 12 wherein said at least one temperature sensor monitors the temperature of said cold fluid.

14. A fluid tempering system as defined in claim 12 wherein said at least one temperature sensor monitors the temperature of said hot fluid.

15. A fluid tempering system as defined in claim 11 further including a first temperature sensor monitoring the temperature of cold fluid delivered to said mixing zone and a second temperature sensor monitoring the temperature of hot fluid delivered to said mixing zone, said valve controlling the amount of cold fluid delivered to said mixing zone in response to said first and second temperature sensors.

16. A fluid tempering system as defined in claim 15 wherein said valve inhibits delivery of cold fluid to said mixing zone in response to said second temperature sensor when the temperature of hot fluid delivered to said hot fluid path is below a pre-set temperature.

17. A fluid tempering system as defined in claim 16 further including a shut-off valve interposed between said mixing zone and said distribution system and a third temperature sensor monitoring the temperature of fluid delivered to said distribution system, said shut-off valve being responsive to said third temperature sensor and inhibiting fluid flow to said distribution system when the temperature of fluid delivered by said mixing zone is above a predetermined scalding water temperature.

18. A fluid tempering system as defined in claim 16 wherein said valve is a mixing valve including said first and second inlets and defining said mixing zone, said mixing valve having an outlet port coupled to said distribution system.

19. A fluid tempering system as defined in claim 16 wherein said mixing zone is constituted by a T-junction including said first inlet receiving hot fluid from said hot fluid path and said second inlet receiving cold fluid from said valve.

* * * * *